Oct. 7, 1958 E. A. GOLDBERG 2,855,510
CURRENT SWITCHING DEVICE
Filed May 27, 1954
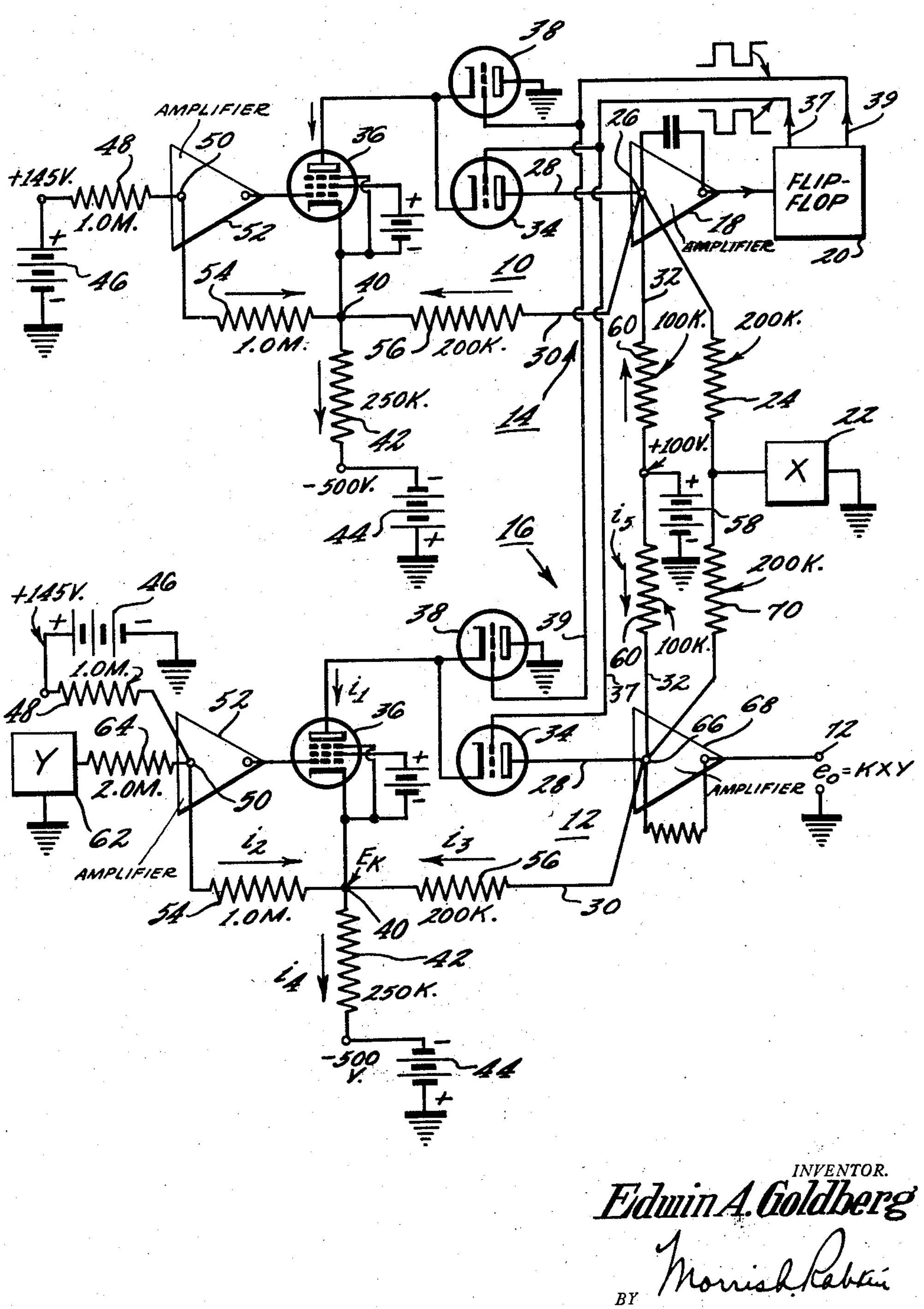
INVENTOR.
Edwin A. Goldberg
BY Morris L. Rabkin
ATTORNEY United States Patent Office 2,855,510

Patented Oct. 7, 1958

2,855,510

CURRENT SWITCHING DEVICE

Edwin A. Goldberg, Princeton Junction, N. J., assignor to Radio Corporation of America, a corporation of Delaware Application May 27, 1954, Serial No. 432,759

9 Claims. (Cl. 250—27)

This invention relates to electronic switches, and particularly to electronic switches for switching different magnitude currents to an output circuit.

In the article "A High-Accuracy Time-Division Multiplier" by E. A. Goldberg, RCA Review, September 1952, page 265, a highly accurate electronic switch is described for switching current from a single current source to one or the other of two current paths. In the particular application of the time-division multiplier of the aforementioned article, currents of the same amplitude and of opposite polarities are applied to an output circuit (in the form of a feedback amplifier). Opposite polarity currents are produced with the aforementioned electronic switch by employing a phase-inverting amplifier in one of the current paths from the single current source. The electronic switch is described and claimed in U. S. Patent No. 2,619,594, of E. A. Goldberg, issued November 25, 1952.

It is an object of this invention to provide an improved current switching system of the type described in which the phase-inverting amplifier is eliminated.

Another object of this invention is to provide a new and improved current switching circuit which is accurate and which is more economical in the components required than prior art circuits.

Another object of this invention is to provide an improved electronic switch circuit which is simple and which is suitable for applications requiring high precision.

In accordance with this invention, a plurality of current paths are connected to the input of a feedback amplifier. A first current path includes a current generating device and a switching device for intermittently coupling the generating device to the amplifier input. A second current path includes a resistor coupled between the amplifier input and a voltage terminal whose voltage is proportional to the current from the generating device. A third current path includes a voltage source coupled through a resistor to the amplifier input. When the switching device in the first current path is open the currents through the second and third paths produce a resultant current to the amplifier input. When the switching device is closed, there is a different resultant current to the amplifier input which is the algebraic sum of the currents in the three paths.

The foregoing and other objects, the advantages and novel features of this invention, as well as the invention itself, both as to its organization and mode of operation, may be best understood when read together with the accompanying drawing, in which like reference numerals refer to like parts.

The drawing consists of a sole figure which is a schematic circuit diagram partially in block form of an embodiment of this invention.

Referring to the drawing, current switching circuits 10, 12 embodying this invention are shown incorporated in a time-division multiplier of the type described in the aforementioned article by Goldberg. The time-division multiplier includes a master computer 14 and a slave computer 16. In the master computer 14, an integrator 18, a flip-flop 20, and the current switching circuit 10 are connected in a feedback loop. A source 22 of varying voltage proportional to a first variable X is connected through a resistor 24 to the input 26 of the integrator 18. Also connected to the integrator input 26 are three current paths 28, 30, 32 in the current switching circuit 10.

The first current path 28 in the switching circuit includes a first grid-controlled switch tube 34 and a constant current genrator 36 shown as a pentode 36. The switch tube 34 anode is connected to the integrator input 26, and its cathode is connected to the anode of the pentode 36. A second switch tube 38 is connected at its anode to a reference potential, shown as ground, and at its cathode directly to the first switch tube 34, cathode and to the pentode 36 anode. Switching pulses of opposite polarities from the outputs 37, 39 of the flip-flops 20 are applied to the grids of the switch tubes 34, 38. The amplitudes of the switching pulses are such as to render one of the switch tubes 34, 38 cut-off and the other conductive. The anode current of the pentode 36 flows through the conductive one of the switch tubes 34, 38. The cathode of the pentode 36 is connected to one terminal 40 of a cathode load resistor 42, and the other terminal of the resistor 42 is connected to a negative potential source 44. A voltage source 46 is connected through a resistor 48 to the input 50 of a feedback amplifier 52, the output of which is connected to the first grid of the pentode 36. The feedback resistor 54 is connected between the amplifier input 50 and the cathode of the pentode 36.

The second current path 30 in the switching circuit 10 includes a resistor 56 connected between the terminal 40 at the pentode 36 cathode and the integrator input 26. The third current path 32 includes a positive voltage source 58 connected through a resistor 60 to the integrator input 26.

The current switching circuit 12 in the slave computer 16 is substantially the same as the master switching circuit 10. For that reason, corresponding parts in the slave switching circuit 12 are referenced by the same numerals. In addition to the circuit components already described above, there is in the slave 16 a source 62 of varying voltage proportional to a second variable Y connected through a resistor 64 to the amplifier input 50. The three current paths 28, 30, 32 in the slave switching circuit 12 are connected to the input 66 of an output amplifier 68. The X voltage source 22 is also connected through a resistor 70 to the amplifier input 66. The output of the amplifier is taken at a terminal 72 connected to the output of the amplifier 68.

The operation of the time-division multiplier is described in detail in the aforementioned article by Goldberg. The flip-flop 20 in the master 14 generates a train of rectangular switching pulses in accordance with the variable X. The ratio of pulse length to period is made a function of the variable X. These switching pulses control the slave switching circuit 12 to feed currents to the output amplifier 68 whose amplitudes are proportional to the variable Y. The average or direct-current component of the output wave train is then proportional to the product of the two variables.

In the master switching circuit 10, with the second switch tube 38 conducting and the first switch tube 34 cut-off, a resultant current of predetermined amplitude and positive polarity is fed to the integrator input 26 through the two current paths 30, 32. Due to the resistor values selected a resultant current of the same amplitude and of negative polarity is fed to the integrator input 26 when the first tube 34 is conducting and the second tube 38 is cut-off. The rate of change of voltage at the output of the integrator 18 is proportional to the algebraic sum of the resultant current from the switching circuit 10 and the current proportional to the variable X. The flip-flop 20 assumes one of the other of two operating conditions accordingly as the integrator 18 output voltage is increasing from a predetermined level or decreasing from another predetermined level. Positive and negative switching pulses from one and the other of the flip-flop outputs respectively render one of the switch tubes conductive and the other cut-off. Thereby, a feedback circuit is completed which quickly adjusts itself to reduce to zero the net average current fed to the integrator input 26 from the switching circuit 10 and the X voltage source 22. As a result, the switching pulses vary as a function of X.

The switching pulses from the flip-flop 20 also control the sleeve 16 switch tubes 34, 38. The resultant currents fed from the slave switching circuit 12 to the amplifier input 66 have the same amplitude (for a given value of Y) and are of opposite polarities accordingly as one or the other of the switch tubes are conducting. The amplitudes of the resultant currents in the slave switching circuit vary with Y. Therefore, the average current fed to the input 66 of the output amplifier is proportional to the product of X and Y. When Y is zero, and X is not zero, the slave switching circuit 12 feeds a finite current proportional to X to the output amplifier 68. To subtract out this spurious current from the output a current proportional to X is fed to the amplifier input 66 through the resistor 70.

In the current switching circuits 10, 12, the pentode 36 anode current is a function of the input voltage from the sources 46 and 62 applied to the pentode 36 grid through the amplifier 52. The voltage at the terminal 40 is proportional to the pentode 36 anode current. This terminal 40 voltage is fed back inversely to the amplifier input 50 through the resistor 54. Due to this feedback, the pentode anode current is a substantially linear function of the voltages from the sources 46 and 62. Due to the unity gain relationship of the feedback resistor 54 and the input resistor 48 in the master 14 the terminal 40 voltage is the inverse of the source 46; i. e. −145 volts for the component values shown in the drawing. In the slave 16, the value of the input resistor 64 for the Y source 62 produces a gain factor of ½. Thus, in the slave switching circuit 12, the terminal 40 voltage $E_k$ is $$\frac{-Y}{2}-145$$

When the first switch tube 34 is conductive, the current in the first current path 28 is the pentode 36 anode current which flows through the first switch tube 34. When the first switch tube 34 is cut-off, there is zero current in the first current path 28, and the pentode 36 anode current flows through the second switch tube 38. Currents continuously flow in the second and third current paths 30, 32. Thus, there is a net continuous current flow due to the second and third current paths 30, 32, and an intermittent current flow in the first current path 28. By appropriate choice of component values the net continuous current is made to be one-half of the intermittent current and of opposite polarity. As a result, the resultant current flow when the first switch tube 34 is conducting is equal in amplitude to the resultant current flow when the second tube 38 is conducting, and the resultant currents have opposite polarities.

Suitable component values to produce equal and opposite resultant switching circuit currents are given in the drawing. These specific component values are for the purpose of illustration and are not to be construed as a limitation on the scope of the invention. Recognizing that the input of a feedback amplifier is maintained at a constant potential (ground for the circuit shown in the drawing) due to the high gain of the amplifier, the following relationships are readily derived for the slave switching circuit 12:

$$i_4=.002+.000004\ E_k$$
$$i_2=-.000001\ E_k$$
$$i_3=-.000005\ E_k$$
$$i_1=i_4-i_2-i_3=.002+.000010\ E_k$$
$$i_5=.001$$

where $$E_k=\frac{-Y}{2}-145$$

When the first switch tube 34 is cut off and X is zero, the resultant current to the amplifier input 66 is $$i_5-i_3=.001+.000005\ E_k$$

and when the first tube 34 is conducting, the resultant current to the amplifier input 66 is $$i_5-i_3-i_1=-.001-.000005\ E_k$$

In general, the following relationships exist among the values of the resistances and voltages sources:

$$R_{60}=-2\frac{E_{58}R_{42}}{E_{44}}$$

and $$R_{56}=\frac{R_{54}R_{42}}{R_{54}+R_{42}}$$

where the subscripts are the reference numerals for the associated components. These two relationships determine the switch characteristic that the net current fed into the amplifier 68 from the switching circuit 12 remains at the same amplitude (for a given $E_k$) when the net current direction is reversed by switching tube 34 being rendered conductive or cut off. The two relationships are readily derived from two conditions. The first condition is a bias condition. The switching circuit 12 can supply only negative currents to amplifier 68 through the first and second paths 28 and 30. Therefore, a positive current is supplied through the third path 32 in order that the direction of the net current may be reversed during the switching operation. This bias condition is $$i_1=2(i_5-i_3)$$

The second condition is a dynamic condition which requires that the bias-condition equation hold for changes in $E_k$. That is to say, the equality of the bias-condition equation also holds after taking the derivative of each term with respect to $E_k$.

If the switch input voltage is constant, as is the case in the master switching circuit 10 in the drawing, the terminal 40 voltage is maintained substantially constant. In that case, the pentode 36 current is also substantially constant. As a result, the resistor 56 may be eliminated, and only two current paths, the first 28 and the third 32 are then employed. The component values are chosen so that the intermittent first path 28 current is twice the continuous third path 32 current and of opposite polarity. The arrangement of a current switch with only two current paths will be readily apparent to one skilled in the art from the above description.

It is apparent from the above description of this invention that an improved and simple current switching system is provided for accurately switching different magnitude currents to a feedback amplifier. The switching circuit is economical in the components required and suitable for applications requiring high precision.

What is claimed is:

1. A circuit for switching different magnitude currents to the input terminal of an amplifier having a feedback impedance, said circuit comprising a plurality of current paths to said amplifier input terminal, one of said paths including a current generating device for generating current of a predetermined polarity and a current switching device interposed in said one path for intermittently coupling said generating device to said amplifier input terminal, a second one of said paths connected in feedback relationship between said input terminal and said generating device and including means for continuously supplying to said amplifier input terminal current of opposite polarity and proportional to that of said current generating device, said current supplying means including a voltage source and a resistance element connected between said voltage source and said amplifier input terminal.

2. A circuit for switching different magnitude currents to the input terminal of an amplifier, said circuit comprising a plurality of current paths to said amplifier input terminal, one of said paths including a current generating device for generating current of a predetermined polarity and a current switching device interposed in said one path for intermittently coupling said generating device to said amplifier input terminal, a second one of said paths connected in feedback relationship between said input terminal and said generating device and including means for continuously supplying to said amplifier input terminal current of opposite polarity and proportional to that of said current generating device, said current supplying means including a voltage source and a resistance element connected between said voltage source and said amplifier input terminal, a third one of said current paths including additional means for continuously supplying current to said amplifier input, said additional current supplying means including a voltage terminal, means for producing a voltage at said terminal proportional to said generating device current, and another resistance element connected between said terminal and said amplifier input.

3. A current switching circuit as recited in claim 2 wherein the magnitude of the current supplied by said first current path is twice the magnitude of the difference between the currents supplied by said second and third current paths.

4. A circuit for switching different magnitude currents to the input terminal of an amplifier, said circuit comprising a plurality of current paths to said amplifier input terminal, one of said current paths including a current generating device, and a current switching device interposed in said one path for intermittently coupling said generating device to said amplifier input terminal, a second one of said paths connected in feedback relationship between said input terminal and said generating device including means for continuously supplying current to said amplifier input terminal including a voltage terminal, means for producing a voltage at said voltage terminal proportional to said generating device current, and a resistance element connected between said voltage terminal and said amplifier input terminal.

5. A circuit for switching different magnitude currents to the input of an amplifier, said circuit comprising a plurality of separate current paths connected to said amplifier input, one of said paths including a current generating device having a plurality of electrodes, a switching device interposed in said one path for intermittently connecting an electrode of said current generating device to said amplifier input to supply current thereto, means for varying the current in said generating device, and a first resistance element connected to an electrode of said current generating device and having a terminal the voltage at which is proportional to the current in said current generating device, a second of said current paths connected in feedback relationship between said input terminal and said generating device including means for continuously supplying current to said amplifier input, said current supplying means including a second resistance element connected between said first resistance element terminal and said amplifier input.

6. A current switching circuit as recited in claim 5 wherein another of said current paths includes means for continuously supplying current to said amplifier input including a source of voltage and a third resistance element connecting said voltage source to said amplifier input.

7. A circuit for switching different magnitude currents to the input of an amplifier, said circuit comprising a plurality of separate current paths connected to said amplifier input, a first one of said paths including a current generating device interposed in said one path and having anode, cathode and control electrodes, a resistor connected to said cathode electrode, means for applying a voltage to said generating device control electrode, two switching devices having anode, cathode and control electrodes, said switching device cathodes being connected together and to said generating device anode, means for applying a reference potential to said anode of one of said switching devices, and means for connecting said anode of the other of said switching devices to said amplifier input, a second one of said current paths connected in feedback relationship between said input terminal and said generating device including a resistor coupled between a terminal of said generating device cathode resistor and said amplifier input.

8. A current switching circuit as recited in claim 7 wherein a third one of said current paths includes a voltage source that is positive with respect to said reference potential, and a resistor connected between said voltage source and said amplifier input.

9. A current switching circuit as recited in claim 8 wherein said means for applying a voltage to said generating device control electrode includes another feedback amplifier having its output connected to said generating device control electrode and its input connected through the feedback impedance to said generating device cathode.

References Cited in the file of this patent

UNITED STATES PATENTS

| | | |
|---|---|---|
| 2,438,947 | Rieke et al. | Apr. 6, 1948 |
| 2,543,028 | Kammer | Feb. 27, 1951 |
| 2,619,594 | Goldberg | Nov. 25, 1952 |
| 2,712,065 | Elbourn et al. | June 28, 1955 |